United States Patent
Chaney

(10) Patent No.: US 9,721,125 B2
(45) Date of Patent: Aug. 1, 2017

(54) ELECTRONIC DEVICE ENCLOSURE

(71) Applicant: Hand Held Products, Inc., Fort Mill, SC (US)

(72) Inventor: David E. Chaney, Lincolnton, NC (US)

(73) Assignee: Hand Held Products, Inc., Fort Mill, SC (US)

(*) Notice: Subject to any disclaimer, the term of this patent is extended or adjusted under 35 U.S.C. 154(b) by 5 days.

(21) Appl. No.: 14/826,835

(22) Filed: Aug. 14, 2015

(65) Prior Publication Data
US 2015/0356327 A1    Dec. 10, 2015

Related U.S. Application Data

(63) Continuation of application No. 13/736,139, filed on Jan. 8, 2013, now Pat. No. 9,107,484.

(51) Int. Cl.
*G06K 7/08*    (2006.01)
*A45C 11/00*    (2006.01)

(52) U.S. Cl.
CPC .............. *G06K 7/087* (2013.01); *A45C 11/00* (2013.01); *G06K 7/089* (2013.01); *A45C 2011/002* (2013.01)

(58) Field of Classification Search
USPC ................................................ 235/449, 380
See application file for complete search history.

(56) References Cited

U.S. PATENT DOCUMENTS

| | | |
|---|---|---|
| D280,674 S | 9/1985 | Nelson |
| D325,471 S | 4/1992 | McCain et al. |
| D337,435 S | 7/1993 | Kaneko et al. |
| 5,554,822 A | 9/1996 | Gilpin et al. |
| 5,574,625 A | 11/1996 | Ohgami et al. |
| 5,586,002 A | 12/1996 | Notarianni |
| 5,625,534 A | 4/1997 | Okaya et al. |
| 6,000,607 A | 12/1999 | Ohki et al. |
| 6,196,460 B1 * | 3/2001 | Shin .......................... G07F 7/08 235/380 |
| 6,304,459 B1 | 10/2001 | Toyosato et al. |
| 6,637,661 B2 | 10/2003 | Cohen et al. |
| 6,679,425 B1 | 1/2004 | Sheppard et al. |
| 6,944,782 B2 | 9/2005 | von Mueller et al. |
| 7,123,487 B2 | 10/2006 | Saito et al. |
| D588,088 S | 3/2009 | Mitchell |
| D588,146 S | 3/2009 | Tsuboi |
| D593,319 S | 6/2009 | Richardson et al. |
| D603,602 S | 11/2009 | Richardson et al. |

(Continued)

FOREIGN PATENT DOCUMENTS

WO    2013106991 A1    7/2013

OTHER PUBLICATIONS

EM 002270553-0001; Honeywell International, Inc.: Filed Jul. 8, 2013; Issued Aug. 23, 2013, 9 pages.

*Primary Examiner* — Ahshik Kim
(74) *Attorney, Agent, or Firm* — Additon, Higgins & Pendleton, P.A.

(57) ABSTRACT

An enclosure for an electronic device includes a device opening and a device window. The enclosure typically includes a door that may be rotated about an axis to provide access to the device opening while remaining connected to the enclosure. Exemplary enclosures include a slot for a magnetic card reading system that facilitates the alignment and insertion of a magnetic card.

18 Claims, 13 Drawing Sheets

(56) References Cited

U.S. PATENT DOCUMENTS

| | | |
|---|---|---|
| D608,781 S | 1/2010 | Wada |
| 7,688,580 B2 | 3/2010 | Richardson et al. |
| D638,012 S | 5/2011 | Tian et al. |
| D659,138 S | 5/2012 | Hsu et al. |
| D659,564 S | 5/2012 | Baxter |
| D665,735 S | 8/2012 | Kang et al. |
| D670,278 S | 11/2012 | Hamann |
| D672,386 S | 12/2012 | Matunuma et al. |
| D678,936 S | 3/2013 | Oliver |
| D696,234 S | 12/2013 | Wright |
| 8,632,004 B2 | 1/2014 | Nishiie |
| 8,662,905 B2 | 3/2014 | Chang |
| 8,827,725 B2 | 9/2014 | Chang |
| D716,285 S | 10/2014 | Chaney |
| D719,166 S | 12/2014 | Brown et al. |
| D733,112 S | 6/2015 | Chaney et al. |
| 9,107,484 B2 | 8/2015 | Chaney |
| 2001/0003071 A1 | 6/2001 | Mansutti et al. |
| 2007/0146985 A1 | 6/2007 | Mick et al. |
| 2008/0132289 A1 | 6/2008 | Wood et al. |
| 2009/0009945 A1 | 1/2009 | Johnson et al. |
| 2013/0264234 A1 | 10/2013 | Cohen |
| 2014/0191644 A1 | 7/2014 | Chaney |
| 2015/0028104 A1 | 1/2015 | Ma et al. |

\* cited by examiner

ELECTRONIC DEVICE ENCLOSURE

CROSS-REFERENCE TO RELATED APPLICATIONS

The present application claims the benefit of U.S. patent application Ser. No. 13/736,139 for an Electronic Device Enclosure filed Jan. 8, 2013 (and published Jul. 10, 2014 as U.S. Patent Application Publication No. 2014/0191644), now U.S. Pat. No. 9,107,484. Each of the foregoing patent application, patent publication, and patent is hereby incorporated by reference in its entirety.

U.S. patent application Ser. No. 29/531,629 for an Electronic Device Enclosure filed Jun. 29, 2015 claims the benefit of U.S. patent application Ser. No. 29/506,922 for an Electronic Device Enclosure filed Oct. 22, 2014, now U.S. Pat. No. D733,112, which claims the benefit of U.S. patent application Ser. No. 29/459,681 for an Electronic Device Enclosure filed Jul. 2, 2013, now U.S. Pat. No. D716,285, which also claims the benefit of U.S. patent application Ser. No. 13/736,139. Each of the foregoing patent applications and patents is hereby incorporated by reference in its entirety.

FIELD OF THE INVENTION

The present invention relates to the field of enclosures for electronic devices, more specifically, to an enclosure that provides an electronic device with additional capabilities.

BACKGROUND

Generally speaking, enclosures for electronic devices typically include some mechanism to allow for the insertion and removal of the electronic device from the enclosure. For example, the enclosure may include an opening for the device or a flexible section of the enclosure that may be deformed to allow insertion of the device. Such mechanisms, however, do not hold the electronic device securely within the enclosure, are difficult for users to manipulate, and require more time to insert and remove the electronic device.

Therefore, a need exists for an enclosure that securely holds an electronic device, is easy for users to manipulate, and facilitates quick insertion and removal of an electronic device.

A variety of devices, such as electronic device enclosures, retail checkout stations, gas station transaction terminals, etc., include a slot for swiping magnetic cards (e.g., credit cards, debit cards, charge cards, and/or membership cards). The device reads the information stored within the card's magnetic strip. In use, the operator aligns the card with the slot, inserts the card into the slots, and slides the card through the slot. Current slot configurations, however, make it difficult for the operator to achieve the appropriate alignment of the card with respect to the slot that is required before the card can then be inserted into the slot. Furthermore, current slot configurations suffer from undesirable friction and exit angles as the card is removed from the slot.

Therefore, a need exists for a magnetic card slot that facilitates insertion of a card and exhibits reduced friction and improved exit angles as the card is removed.

SUMMARY

Accordingly, in one aspect, the present invention embraces a door for an electronic device enclosure including a door body, two hinge arms connected to the door body, a rotating hinge on each of the hinge arms for engaging the enclosure, and a mechanical snap connected to the door body for mechanically engaging the enclosure. The door body typically has an interior surface for engaging an electronic device within the enclosure. The hinge arms typically extend outward from the door body's interior surface. The rotating hinges engage the enclosure such that the door remains connected to the enclosure and the door body is rotatable about an axis generally defined by the two rotating hinges.

In an exemplary embodiment, the mechanical snaps extend substantially perpendicularly outward from the door body's interior surface.

In another exemplary embodiment, the door includes two or more mechanical snaps connected to the door body for mechanically engaging the enclosure.

In yet another exemplary embodiment, the door body has an exterior surface that matches the contours of the enclosure In yet another exemplary embodiment, the door body has an exterior surface including finger grips.

In yet another exemplary embodiment, the door includes a security latch having a screw for securing the door to the enclosure thereby preventing the door from opening.

In yet another exemplary embodiment, the door includes one or more locating bosses for engaging an edge of an electronic device within the enclosure In yet another exemplary embodiment, the door body includes a button opening and the door includes a button extending through the button opening to at least the door body's interior surface.

In another aspect, the present invention embraces a slot for a magnetic card reading system. The slot includes a central section and an upper section joined at an upper junction. The central section has a first inner surface and a second inner surface that are (i) substantially parallel and (ii) separated from each other by a substantially uniform central separation D. The central section's first and second inner surfaces define a swipe plane parallel to and equidistant from the central section's first and second inner surfaces. The upper section has a first inner surface adjoining the central section's first inner surface and a second inner surface adjoining the central section's second inner surface. The upper section's first inner surface is separated from the swipe plane by a separation X1, and the upper section's second inner surface is separated from the swipe plane by a separation X2. At the upper junction between the central section and the upper section, the separation X1+X2 between the upper section's first inner surface and the upper section's second inner surface is approximately equal to the central separation D. Typically, the separation X1 and the separation X2 increase as the distance from the upper junction along the swipe plane increases.

In an exemplary embodiment, the separation X1 and the separation X2 increase linearly as the distance from the upper junction along the swipe plane increases.

In another exemplary embodiment, the separation X1 and the separation X2 increase parabolically as the distance from the upper junction along the swipe plane increases.

In yet another exemplary embodiment, the separation X1 and the separation X2 remain approximately equal as the distance from the upper junction along the swipe plane increases.

In yet another exemplary embodiment, the separation X1 and the separation X2 increase at different rates as the distance from the upper junction along the swipe plane increases.

In yet another exemplary embodiment, the upper section's first inner surface and the upper section's second inner surface define an angle of approximately 31 degrees.

In yet another exemplary embodiment, the slot includes a lower section joined to the central section at a lower junction. The lower section has a first inner surface adjoining the central section's first inner surface and a second inner surface adjoining the central section's second inner surface. The lower section's first inner surface is separated from the swipe plane by a separation Y1, and the lower section's second inner surface is separated from the swipe plane by a separation Y2. At the lower junction between the central section and the lower section, the separation Y1+Y2 between the lower section's first inner surface and the lower section's second inner surface is approximately equal to the central separation D. The separation Y1 increases as the distance from the lower junction along the swipe plane increases.

In yet another exemplary embodiment including a lower section, the separation Y2 is substantially constant as the distance from the lower junction along the swipe plane increases.

In yet another exemplary embodiment including a lower section, the separation Y1 increases linearly as the distance from the lower junction along the swipe plane increases.

In yet another exemplary embodiment including a lower section, the separation Y1 increases parabolically as the distance from the lower junction along the swipe plane increases.

In yet another exemplary embodiment including a lower section, the lower section's first inner surface and the lower section's second inner surface define an angle of approximately 19 degrees.

In yet another aspect, the present invention embraces an electronic device enclosure that includes a door in accordance with the first aspect and a slot for a magnetic card reading system in accordance with the second aspect.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
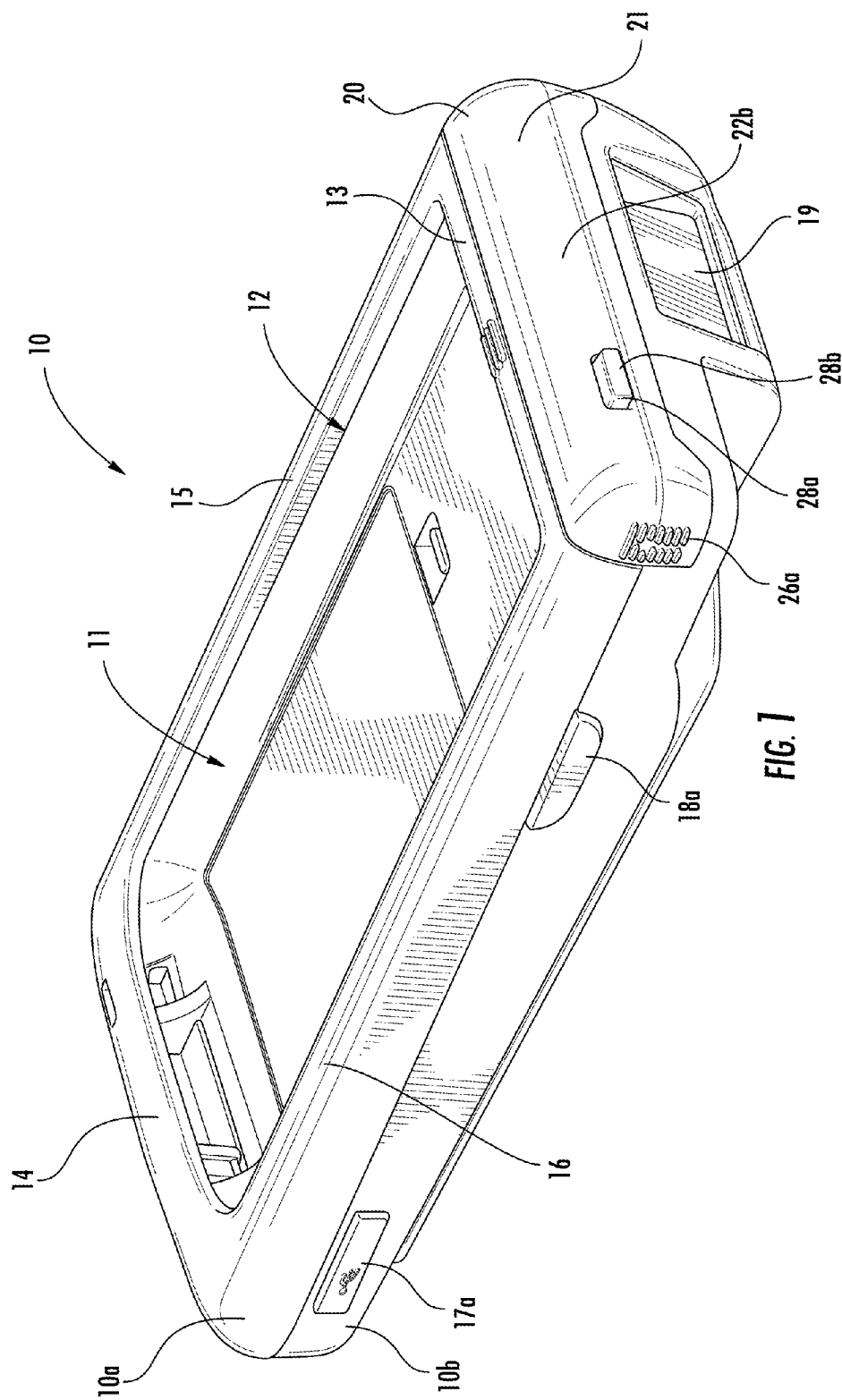
FIG. 1 depicts an exemplary embodiment of an electronic device enclosure in accordance with the present invention.

The present invention embraces a door for an electronic device enclosure that securely holds an electronic device, is easy for users to manipulate, and facilitates quick insertion and removal of an electronic device.

Exemplary doors include a door body having an exterior surface and an interior surface. Typically, the door body's exterior surface matches the contours of the enclosure with which it works. The door body's exterior surface may also include finger grips, such as indentations or ridges, optionally bearing indicia indicating the proper direction of movement required to open the door.

The door body's interior surface typically engages or abuts the electronic device (e.g., an iOS-based device manufactured by Apple, Inc., such as an iPod or iPhone) within the enclosure when the door is in a closed position. In this regard, the door may include one or more locating bosses (e.g., on the interior surface) to position the electronic device correctly within the enclosure when the door is in a closed position.

The door typically includes at least one mechanical snap connected to the door body for mechanically engaging the enclosure. In this regard, the mechanical snap functions with the enclosure such that, upon application of sufficient force to the door body, the mechanical snaps engage the enclosure to keep the door closed. The mechanical snap typically extends substantially perpendicularly outward from the door body's interior surface. That said, the mechanical snap may take a variety of shapes and orientations to interface and engage with the enclosure.

The door also includes two hinge arms connected to the door body that each includes a rotating hinge at their respective ends that are not connected to the door body. In other words, one end of each hinge arm is connected to the door body, and a rotating hinge is attached to, or a part of, the other end of the hinge arm. The hinge arms typically extend substantially perpendicularly outward from the door body's interior surface. That said, the hinge arms may extend from the door body at any angle appropriate to place the rotating hinges in the correct position to interact with the enclosure and/or provide the appropriate motion of the door body during opening and closing.

The rotating hinges engage the enclosure such that the door remains connected to the enclosure. In this regard, the rotating hinges may include a stop tab and/or protrusion that interacts with the enclosure to allow the hinge to move inward and outward within the enclosure but prevents the rotating hinge from being pulled out of the enclosure thereby disconnecting the door.

The rotating hinges typically also engage the enclosure such that the door body is rotatable about an axis defined by the rotating hinges (i.e., an axis passing through the approximate center of each hinge). In this regard, the rotating hinges allow rotation of the door body to permit insertion or installation of the electronic device within the enclosure while preventing the door from becoming detached or disconnected from the enclosure.

The door may also include a security latch having a screw (e.g., a torx, Allen/hex, Phillips-head, flat-head, or star-drive screw) for securing the door to the enclosure. The security latch may be used to lock the door to the enclosure, thereby preventing theft or unwanted removal of the electronic device.

In some embodiments, the door includes a button. The door body includes a button opening and the button extends through the button opening to at least the door body's interior surface. The button may extend beyond the door body's exterior surface. The button may be connected to electronics within the enclosure. The button may also be a physical button that engages a button (e.g., a power button) on the external surface of an electronic device within the enclosure.

In another aspect, the prevent invention embraces a magnetic card slot that facilitates insertion of a card and exhibits reduced friction and improved exit angles as the card is removed. In exemplary embodiments, the slot includes a central section and an upper section that are joined at an upper junction. The central section typically has a first inner surface and a second inner surface that are substantially parallel to each other and are separated from each other by a substantially uniform central separation D.

Generally, the central section of the slot may include the magnetic card reading components of a magnetic card reading system. The central section typically provides the appropriate alignment and/or orientation of the magnetic strip of a card as it is swiped through the slot. In this regard, the central section's first and second inner surfaces define a swipe plane that is parallel to and equidistant from the central sections' first and second inner surfaces.

As noted, the slot may include an upper section joined to the central section at an upper junction. The upper section has a first inner surface adjoining the central section's first inner surface and a second inner surface adjoining the central section's second inner surface. The upper section's first inner surface is separated from the swipe plane by a separation X1. Similarly, the upper section's second inner surface is separated from the swipe plane by a separation X2.

The upper junction, at which each section's respective inner surfaces meet, is typically a smooth surface to facilitate the swiping of a magnetic card through the slot. In this regard, at the upper junction, the separation X1+X2 between the upper section's first inner surface and the upper section's second inner surface is approximately equal to the central separation D.

The upper section's first and second inner surfaces typically diverge to provide a wider entry or exit angle for a magnetic card to be swiped through the slot. In this regard, the separation X1 (i.e., the separation between the upper section's first inner surface and the swipe plane) typically increases as the distance from the upper junction along the swipe plane increases. The separation X2 (i.e., the separation between the upper section's second inner surface and the swipe plane) may also increase as the distance from the upper junction along the swipe plane increases. The increasing separation distance between the upper section's inner surfaces facilitates an operator's alignment, insertion, and/or removal of a card with respect to the slot.

In exemplary embodiments wherein separation X1 and separation X2 both increase, the rate at which separation X1 and separation X2 increase is typically different. That said, the rate at which separation X1 and separation X2 increase may be the same.

The separation X1 between the upper section's first inner surface and the swipe plane and the separation X2 between the upper section's second inner surface and the swipe plane may increase substantially linearly as the distance from the upper junction along the swipe plane increases.

Alternatively, the separation X1 and separation X2 may increase parabolically as the distance from the upper junction along the swipe plane increases. In such embodiments, the upper section provides a rounded entry or exit for a magnetic card being swiped through the slot. Such rounding further facilitates an operator's alignment, insertion, and/or removal of a card with respect to the slot.

In exemplary embodiments, the upper section's first inner surface and the upper section's second inner surface define an angle of approximately 31 degrees.

Exemplary slots may also include a lower section joined to the central section at a lower junction. The lower section has a first inner surface adjoining the central section's first inner surface and a second inner surface adjoining the central section's second inner surface. The lower section's first inner surface is separated from the swipe plane by a separation Y1. Similarly, the lower section's second inner surface is separated from the swipe plane by a separation Y2.

The lower junction, at which each section's respective inner surfaces meet, is typically a smooth surface to facilitate the swiping of a magnetic card through the slot. In this regard, at the lower junction, the separation Y1+Y2 between the lower section's first inner surface and the lower section's second inner surface is approximately equal to the central separation D.

The lower section's first and second inner surfaces typically diverge to provide a wider entry or exit angle for a magnetic card to be swiped through the slot. In this regard, the separation Y1 (i.e., the separation between the lower section's first inner surface and the swipe plane) typically increases as the distance from the lower junction along the swipe plane increases. The separation Y2 (i.e., the separation between the lower section's second inner surface and the swipe plane) may also increase as the distance from the lower junction along the swipe plane increases. The increasing separation distance between the lower section's inner surfaces facilitates an operator's alignment, insertion, and/or removal of a card with respect to the slot.

In exemplary embodiments wherein separation Y1 and separation Y2 both increase, the rate at which separation Y1 and separation Y2 increase is typically different. That said, the rate at which separation Y1 and separation Y2 increase may be the same.

The separation Y1 between the upper section's first inner surface and the swipe plane and the separation Y2 between the upper section's second inner surface and the swipe plane may increase substantially linearly as the distance from the upper junction along the swipe plane increases.

Alternatively, the separation Y1 and separation Y2 may increase parabolically as the distance from the upper junction along the swipe plane increases. In such embodiments, the upper section provides a rounded entry or exit for a magnetic card being swiped through the slot. Such rounding further facilitates an operator's alignment, insertion, and/or removal of a card with respect to the slot.

In exemplary embodiments, the lower section's first inner surface and the lower section's second inner surface define an angle of approximately 19 degrees.

In an exemplary slot including a lower section, the separation Y1 increases as the distance from the lower junction along the swipe plane increases, while the separation Y2 is substantially constant as the distance from the lower junction along the swipe plane increases.

In exemplary embodiments according to the present invention, the magnetic card slot includes a swiping section and an entrance section. The swiping section includes the magnetic card reading components of a magnetic card reading system and generally defines the plane through which the magnetic strip of the card should be swiped (i.e., the swipe plane). The transition between the swiping section and entrance section is typically smooth.

The slot's entrance section includes walls or surfaces that are angled away from the swipe plane to facilitate alignment, insertion, and/or removal of a card from the slot. The entrance section provides an entry angle between the walls or surfaces of approximately 31 degrees.

The slot may also include an exit section. The exit section may similarly include walls or surfaces that are angled away from the swipe plane to facilitate alignment, insertion, and/or removal of a card from the slot. That said, one or both of the exit section's walls or surfaces may be parallel to the swipe plane. In an exemplary embodiment, the exit section provides an exit angle between the walls or surfaces of approximately 19 degrees.

The slot's entrance section and/or exit section may also include rounds and/or curved edges to facilitate alignment, insertion, and/or removal of a card from the slot. The rounds and/or curved edges curve away from the swipe plane. Exemplary rounds and/or curved edges curve away from the swipe plane in the swipe direction (i.e., the direction that the magnetic strip of the card should be swiped). For example, the exit section may include rounds and/or curved edges curving away from the swipe plane in the swipe direction to facilitate a more intuitive removal of a magnetic card after it has been swiped through the slot.

The rounds and/or curved edges may also curve away from the swipe plane in a direction opposite the swipe direction. For example, the entrance section may include rounds and/or curved edges curving away from the swipe plane in the direction opposite the swipe direction to facilitate a more intuitive alignment and insertion of a magnetic card into the slot.

The rounds and/or curved edges may also curve away from the swipe plane in a direction perpendicular to the swipe direction to facilitate a more intuitive alignment, insertion, and/or removal of the magnetic card from the slot.

Furthermore, the rounds and/or curved edges may curve away from the swipe plane in any direction to facilitate a more intuitive alignment, insertion, and/or removal of the magnetic card from the slot. Additionally, exemplary entrance or exit sections may include rounds and/or curved edges that curve away from the swipe plane in multiple directions depending upon their placement on the entrance or exit section.

Figure 2:
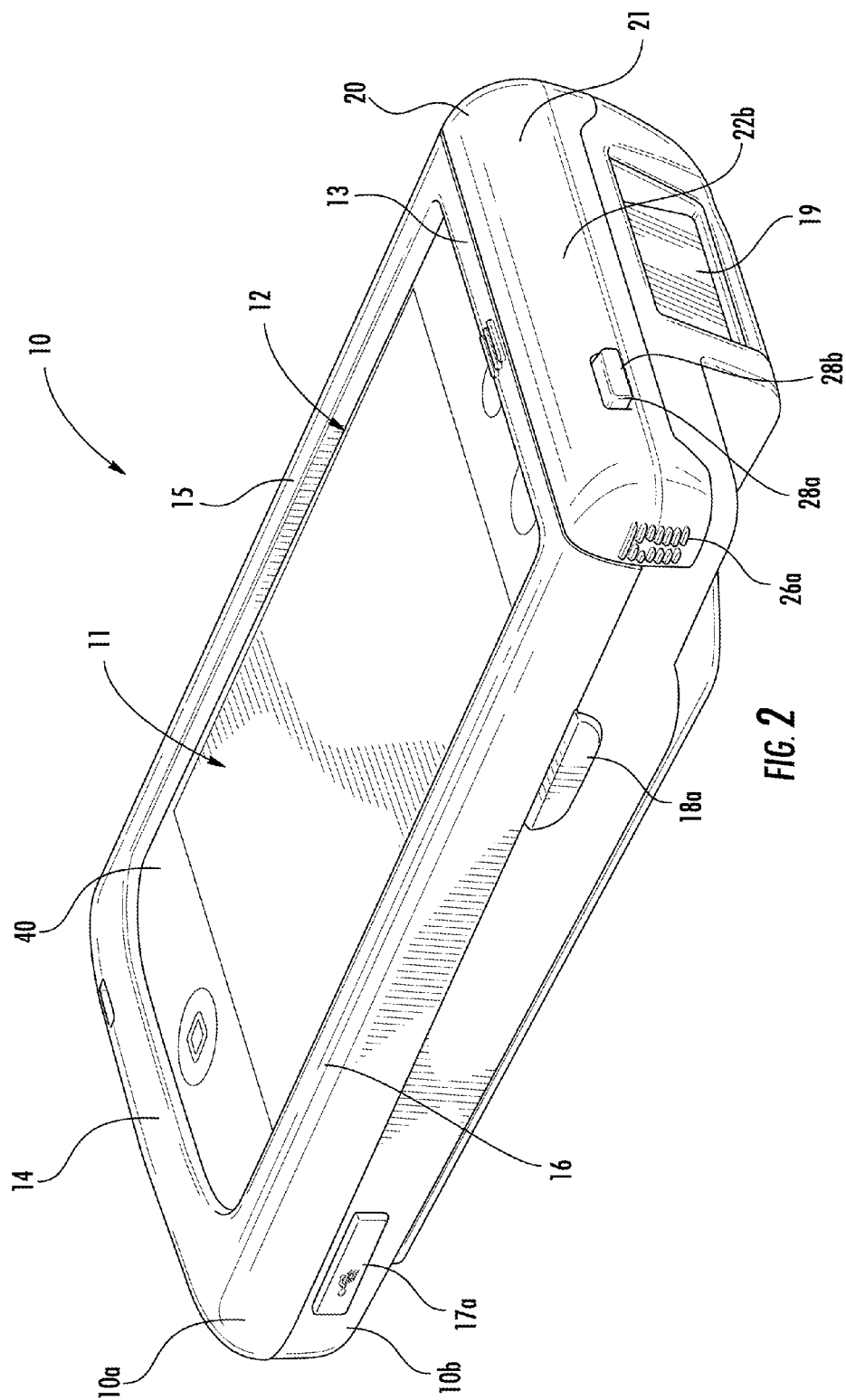
FIG. 2 depicts the exemplary enclosure of FIG. 1 holding an electronic device.

FIGS. 1 and 2 depict an exemplary embodiment of an electronic device enclosure in accordance with the present invention. FIG. 1 depicts the exemplary enclosure 10 without an electronic device 40 therein, while FIG. 2 depicts the enclosure 10 holding an electronic device 40. The enclosure 10 includes a top portion 10a and a bottom portion 10b. The enclosure 10 also includes a device opening 11 for holding an electronic device 40.

The enclosure 10 has a device window 12 for providing access to an electronic device 40 placed in the device opening 11. The device window 12 is bordered by the front edge 13, back edge 14, left edge 15, and right edge 16.

As depicted, the enclosure 10 includes an auxiliary port 17a. The auxiliary port 17a may be an input/output connector (e.g., a USB port) for providing a connection between the enclosure and an external device (e.g., a PC). The auxiliary port 17a may also be an opening in the enclosure 10 that provides access to a port in an electronic device 40 within the enclosure 10.

The enclosure 10 also includes an auxiliary button 18a. The auxiliary button 18a may be connected to electronics within the enclosure 10. The auxiliary button 18a may also be a physical button that engages a button on the external surface of an electronic device 40 within the enclosure 10.

As depicted, the enclosure 10 includes a transmission window 19. The transmission window 19 may provide an opening for exemplary embodiments of the enclosure that include an image capture and processing system and/or laser-based indicia reading system.

The enclosure 10 typically includes a door 20 that facilitates the insertion and removal of an electronic device 40. The door 20 may be located at the enclosure's front edge 13 or the enclosure's back edge 14. In some embodiments, the enclosure 10 may include a door 20 at both the front edge 13 and the back edge 14.

As depicted in FIGS. 1 and 2, the door 20 includes an exterior surface 22b and a finger grip 26a. The door's exterior surface 22b matches the contours of the enclosure 10 (e.g., the contours of the top portion 10a and bottom portion 10b).

The door 20 also includes a button opening 28a and button 28b. The button 28b extends through the button opening 28a to at least the door body's interior surface (not shown). As depicted, the button 28b may extend beyond the door's exterior surface 22b. The button 28b may be connected to electronics within the enclosure 10. The button 28b may also be a physical button that engages a button (e.g., a power button) on the external surface of an electronic device within the enclosure 10.

Figure 3:
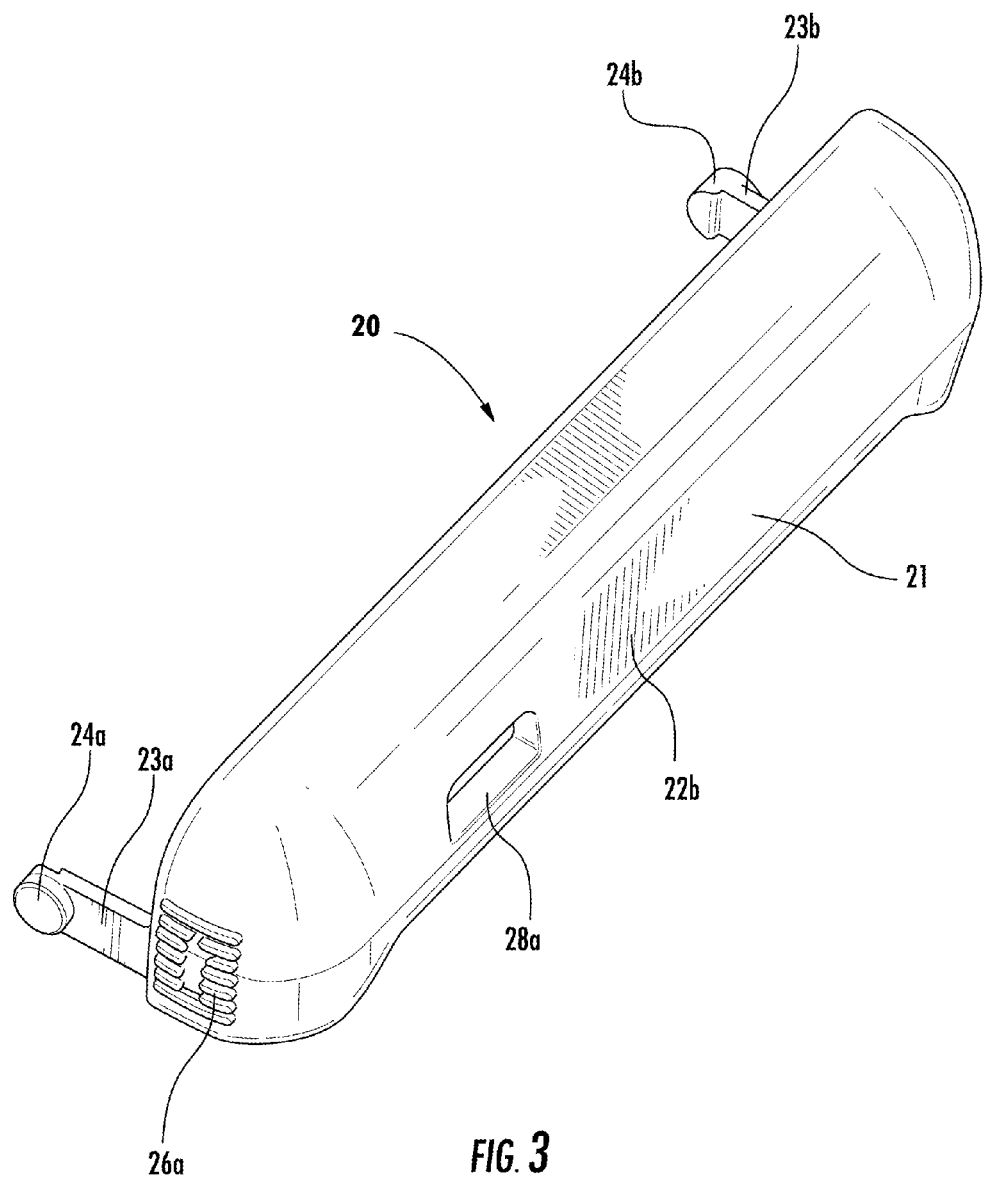
FIG. 3 depicts an exemplary embodiment of a door for an enclosure in accordance with the present invention.
Figure 4:
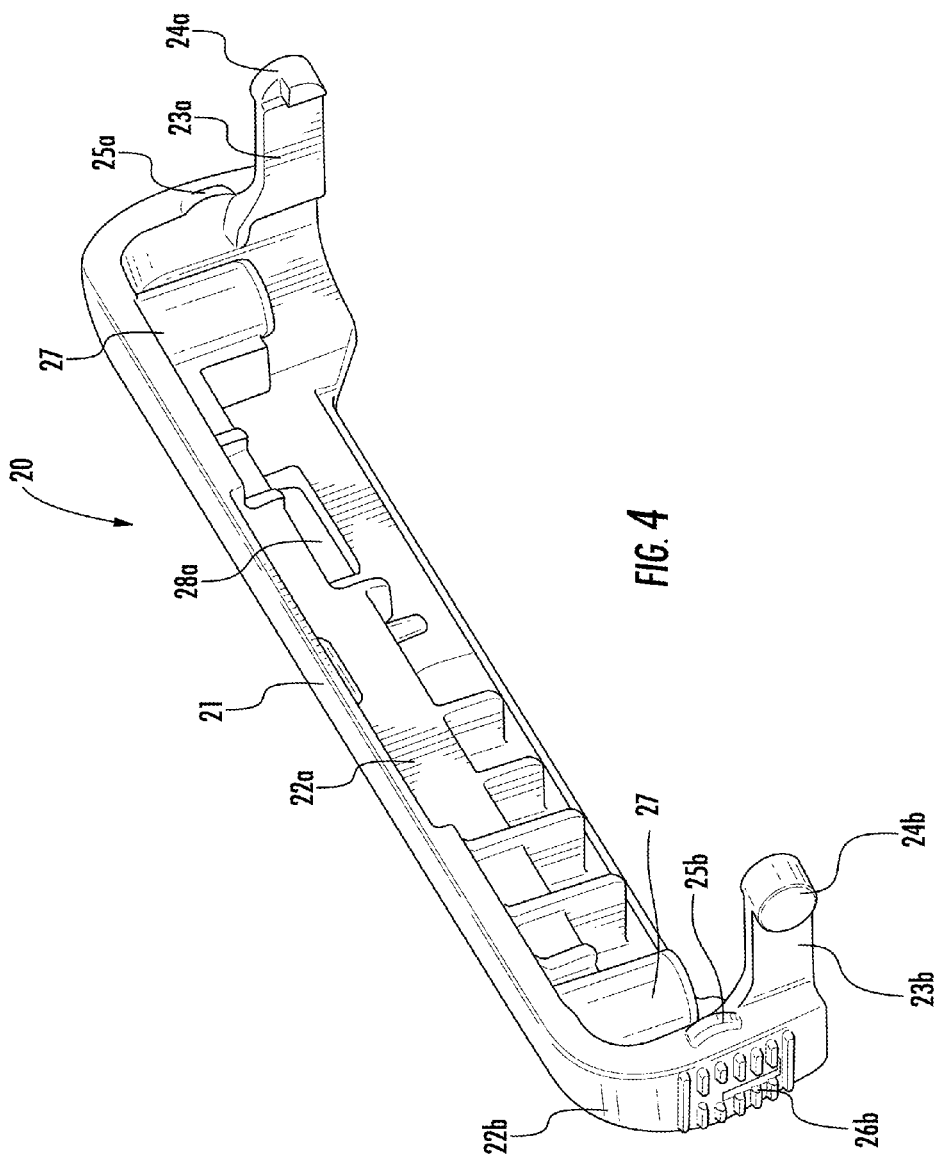
FIG. 4 depicts another view of the exemplary door of FIG. 3.

FIGS. 3 and 4 depict views of the exterior and interior, respectively, of an exemplary door 20. As shown, the door 20 includes a door body 21, an exterior surface 22b, finger grips 26a and 26b, and a button opening 28a. The door 20 also includes hinge arms 23a and 23b extending perpendicularly outward from the door body 21. Rotating hinges 24a and 24b are located at the ends of arms 23a and 23b, respectively.

The door 20 also includes an interior surface 22a and locating bosses 27. The locating bosses 27 are typically of appropriate size and shape to correctly position an electronic device within the enclosure 10 when the door 20 is in a closed position.

The door 20 includes two mechanical snaps 25a and 25b extending substantially perpendicularly outward from the door body's interior surface 22a. The mechanical snaps 25a and 25b engage the enclosure 10 to keep the door 20 closed.

Figure 5:
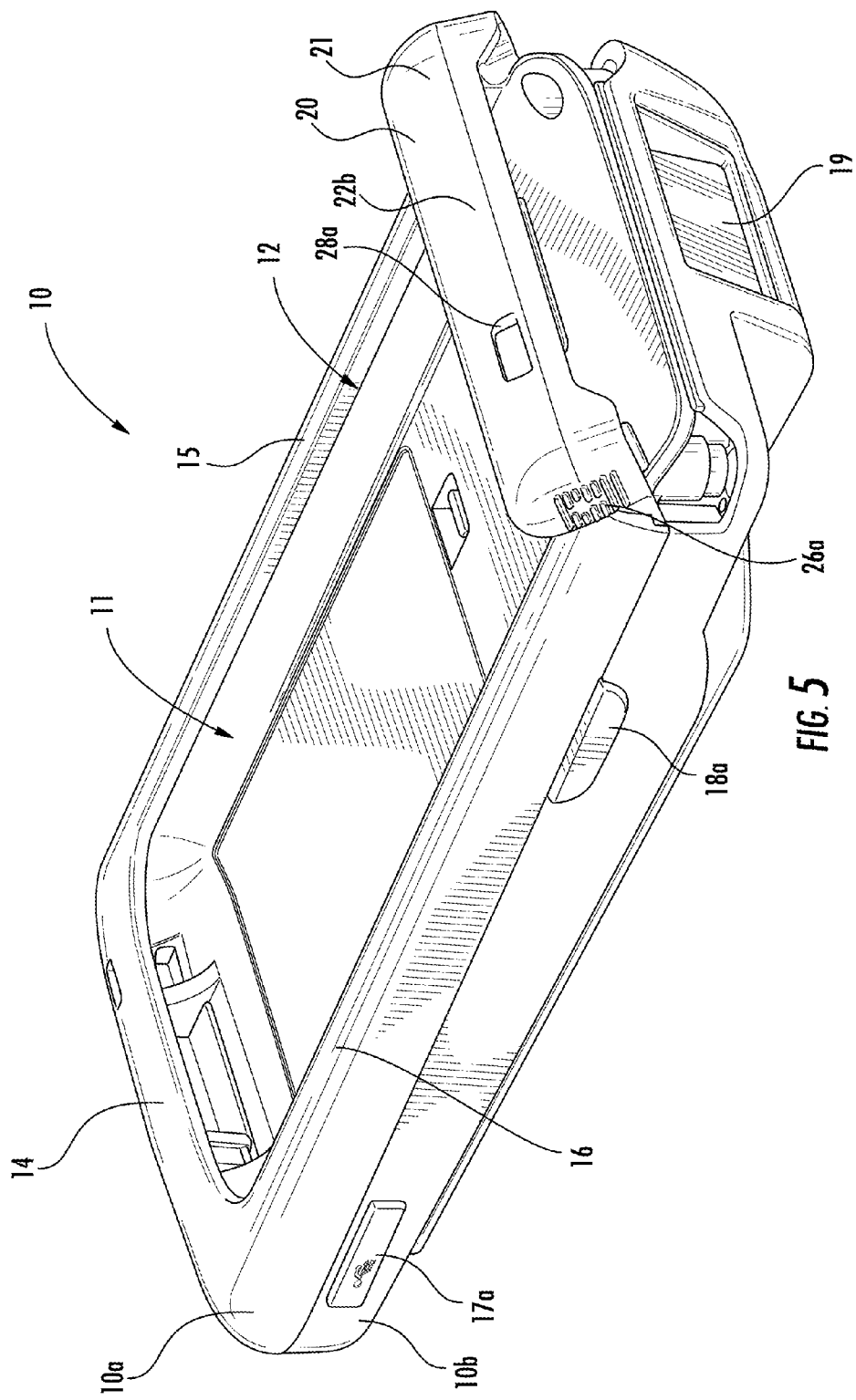
FIG. 5 depicts the exemplary enclosure of FIGS. 1 and 2 without an electronic device and with the door in an open position.

FIG. 5 depicts the exemplary enclosure 10 of FIGS. 1 and 2 without an electronic device 40 and with the door 20 in an open position. As depicted, the interaction between the door's rotating hinges and hinge arms with the enclosure 10 permit the door body 21 to rotate upward providing access to the device opening 11. An electronic device can be inserted into the device opening 11 while the door 20 is still connected to the enclosure 10.

Figure 6:
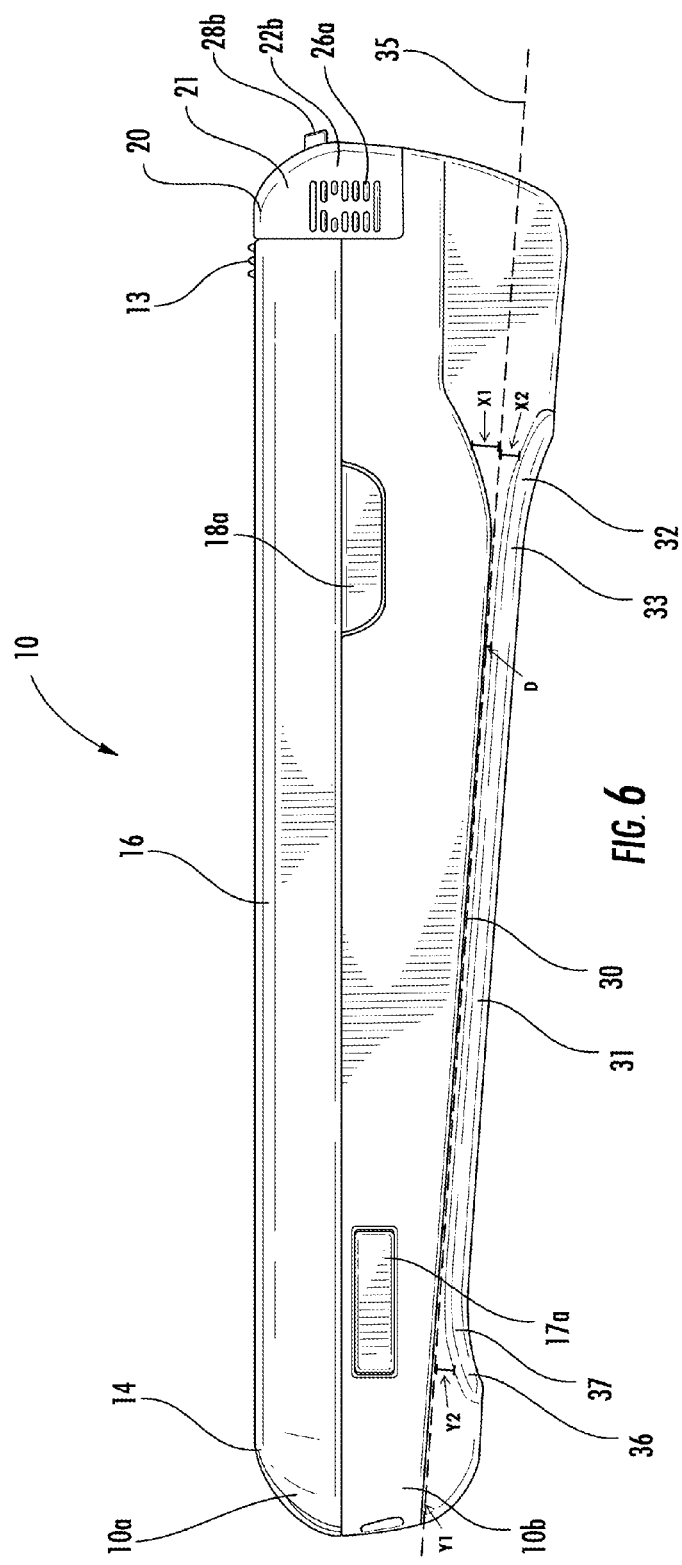
FIG. 6 depicts a side view of the exemplary enclosure of FIGS. 1-2 and 5.

FIG. 6 depicts a side view of the exemplary enclosure 10 of FIGS. 1-2 and 5. As depicted, the enclosure 10 also includes a slot 30 for a magnetic card reading system within the enclosure 10. The slot 30 is typically on the bottom portion 10b of the enclosure 10 and includes a central section 31, an upper section 32, and a lower section 36.

The central section 31 has two surfaces that are substantially parallel to each other and are separated by a substantially uniform distance D. The surfaces of the central section 31 define a swipe plane 35 that is equidistant from each surface that approximates the plane through which a magnetic card would be swiped.

The upper section 32 is joined to the central section 31 at the upper junction 33, while the lower section 36 is joined to the central section 31 at the lower junction 37. The upper and lower junctions 33 and 37 are typically the location at which the surfaces of the slot 30 begin diverging from the swipe plane 35.

The upper section 32 has two surfaces that are separated from the swipe plane 35 by separations X1 and X2. As depicted, separations X1 and X2 typically increase as the distance from the upper junction 33 along the swipe plane 35 increases. In this regard, the upper section's surfaces curve away from the swipe plane 35 to facilitate the insertion and alignment of a magnetic card to be swiped through slot 30. As depicted, the upper section's surfaces define an entry angle of approximately 31 degrees.

The lower section 32 also has two surfaces that are separated from the swipe plane 35 by separations Y1 and Y2. As depicted, separation Y1 increases as the distance from the lower junction 37 along the swipe plane 35 increases, while separation Y2 is substantially constant as the distance from the lower junction 37 along the swipe plane 35 increases. In this regard, the bottom surface of the lower section 36 curves away from the swipe plane 35 to facilitate the removal of a magnetic card swiped through slot 30 (e.g., via a more natural or ergonomic movement). As depicted, the lower section's surfaces define an exit angle of approximately 19 degrees.

As noted, the upper and lower junctions 33 and 37 are typically the location at which the surfaces of the slot 30 begin diverging from the swipe plane 35. In exemplary embodiments, however, the slot's surfaces may begin diverging from the swipe plane 35 at different locations along the swipe plane 35. In other words, the upper surface of the slot may diverge from the swipe plane 35 closer to the center of the slot 30 than the lower surface. Thus, the upper and lower junctions 33 and 37 should be considered approximate sections along the slot 30 rather than precise locations equidistant from the center of the slot 30.

Figure 7:
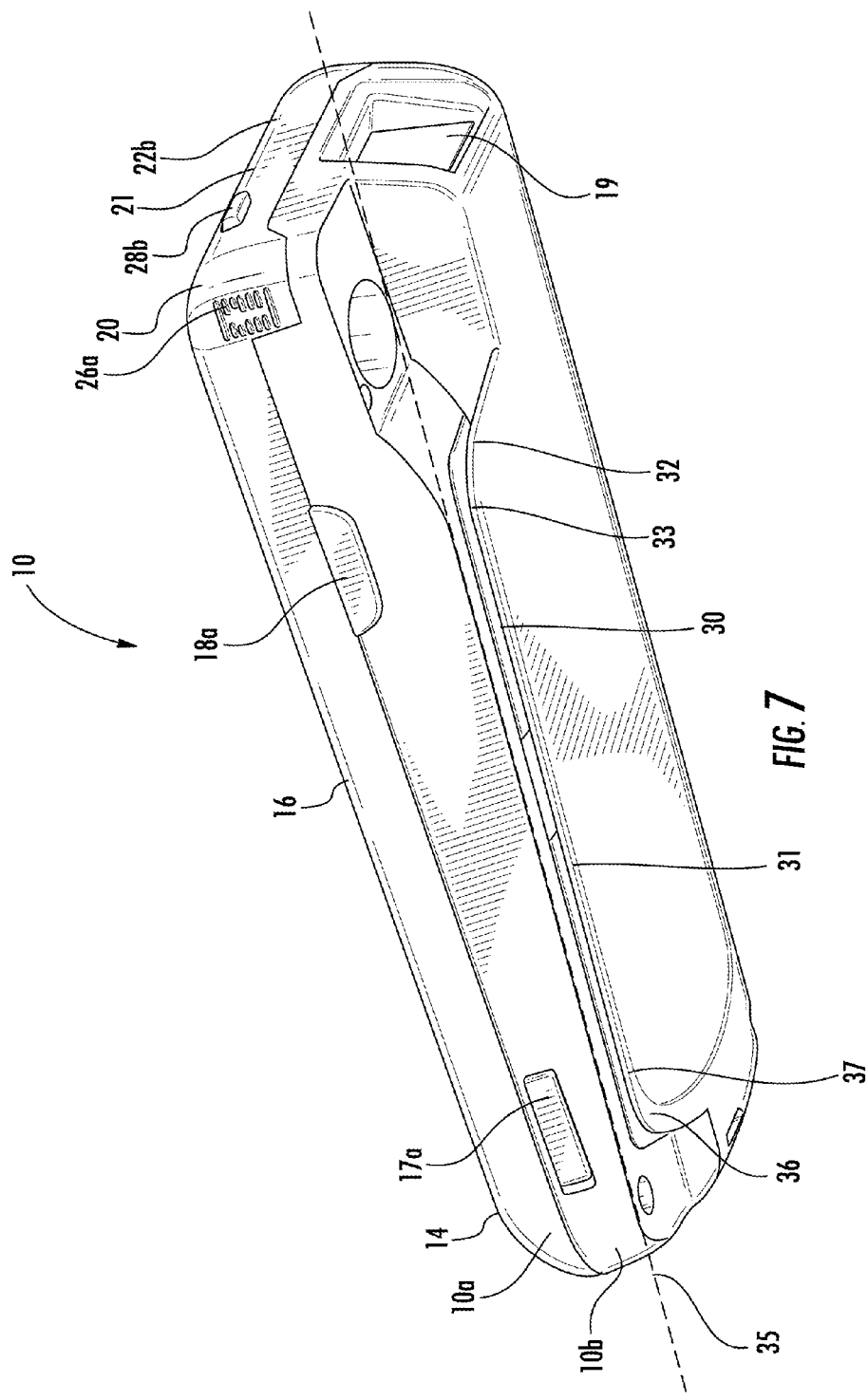
FIG. 7 depicts another view of the exemplary enclosure of FIGS. 1-2 and 5-6.
Figure 8:
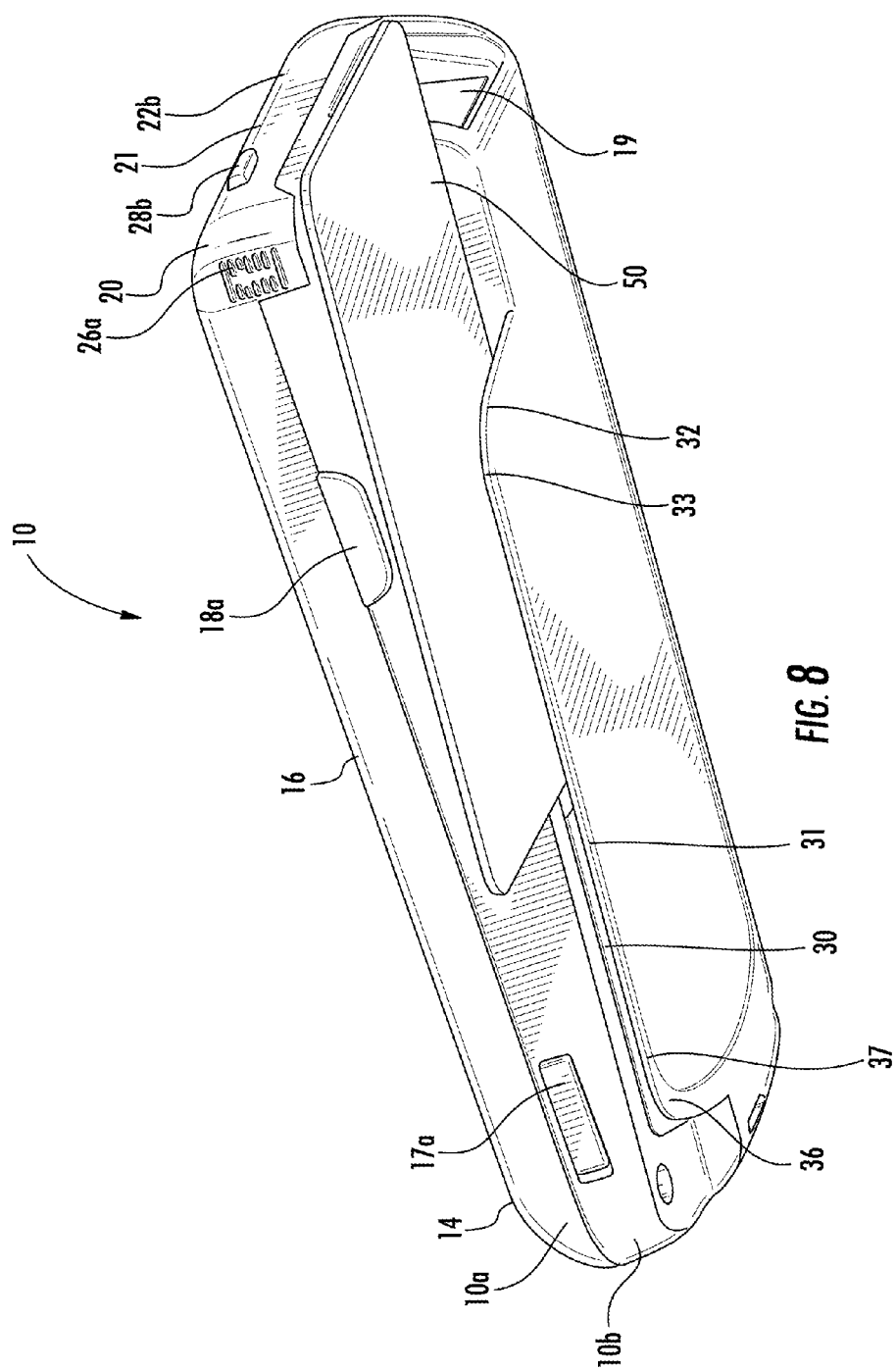
FIG. 8 depicts yet another view of the exemplary enclosure of FIGS. 1-2 and 5-7.

FIGS. 7 and 8 depict additional views of the exemplary enclosure 10 of FIGS. 1-2 and 5-6. FIG. 8 also depicts a card 50 being swiped through the slot 30. As depicted, the slot 30 has enough depth (i.e., distance from the outer right edge of the enclosure 10) to permit the magnetic strip portion of a magnetic card 50 to pass through the slot 30 and be read by a magnetic card reading system.

Figure 9:
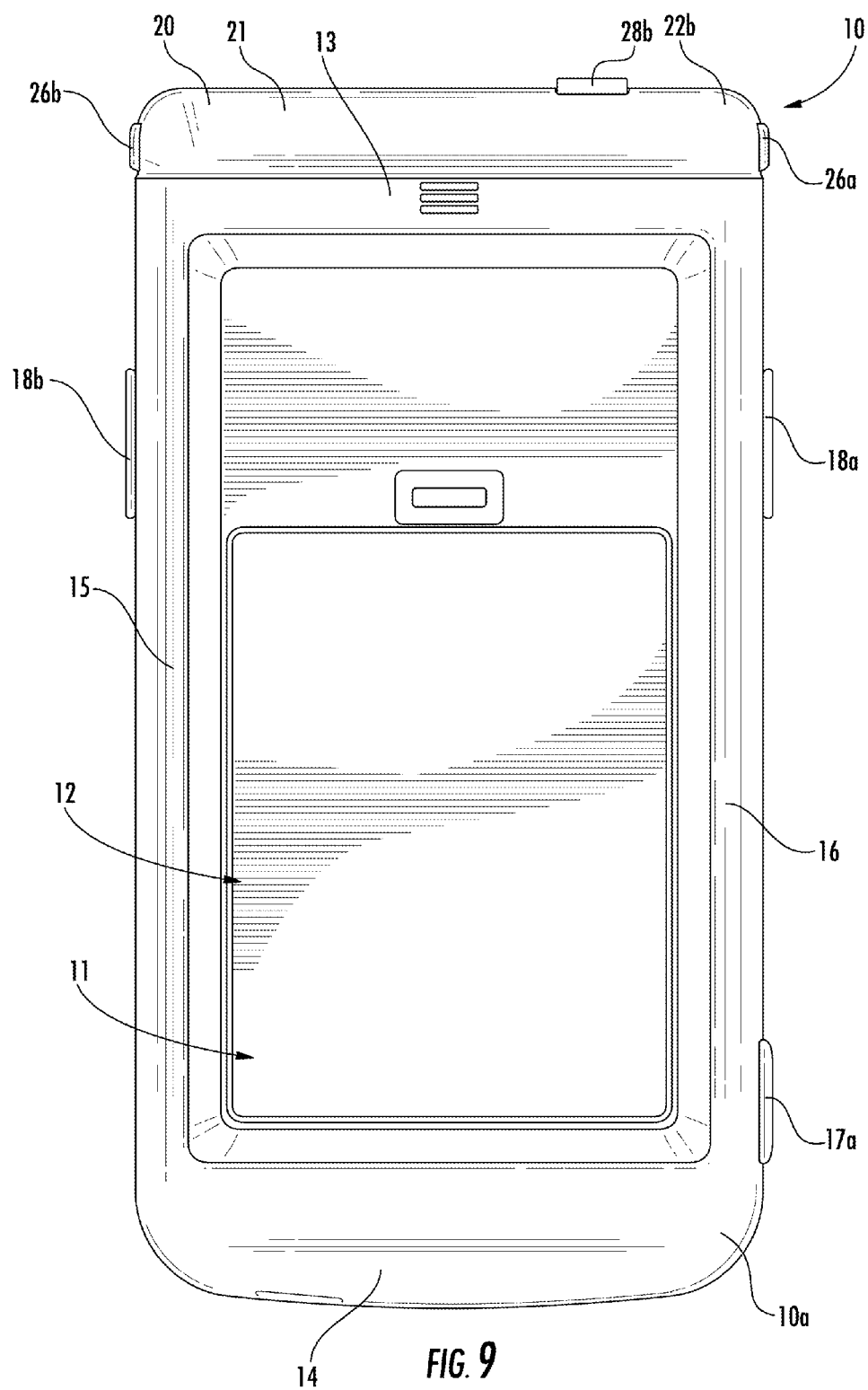
FIG. 9 depicts yet another view of the exemplary enclosure of FIGS. 1-2 and 5-8.

FIG. 9 depicts another view of the exemplary enclosure 10 of FIGS. 1-2 and 5-8. As depicted, the enclosure 10 includes another auxiliary button 18b. The auxiliary button 18b may be connected to electronics within the enclosure 10. The auxiliary button 18b may also be a physical button that engages a button on the external surface of an electronic device 40 within the enclosure 10. As depicted, the enclosure 10 has two auxiliary buttons 18a and 18b, but it is within the scope of the present invention for the enclosure 10 to have three or more auxiliary buttons.

Figure 10:
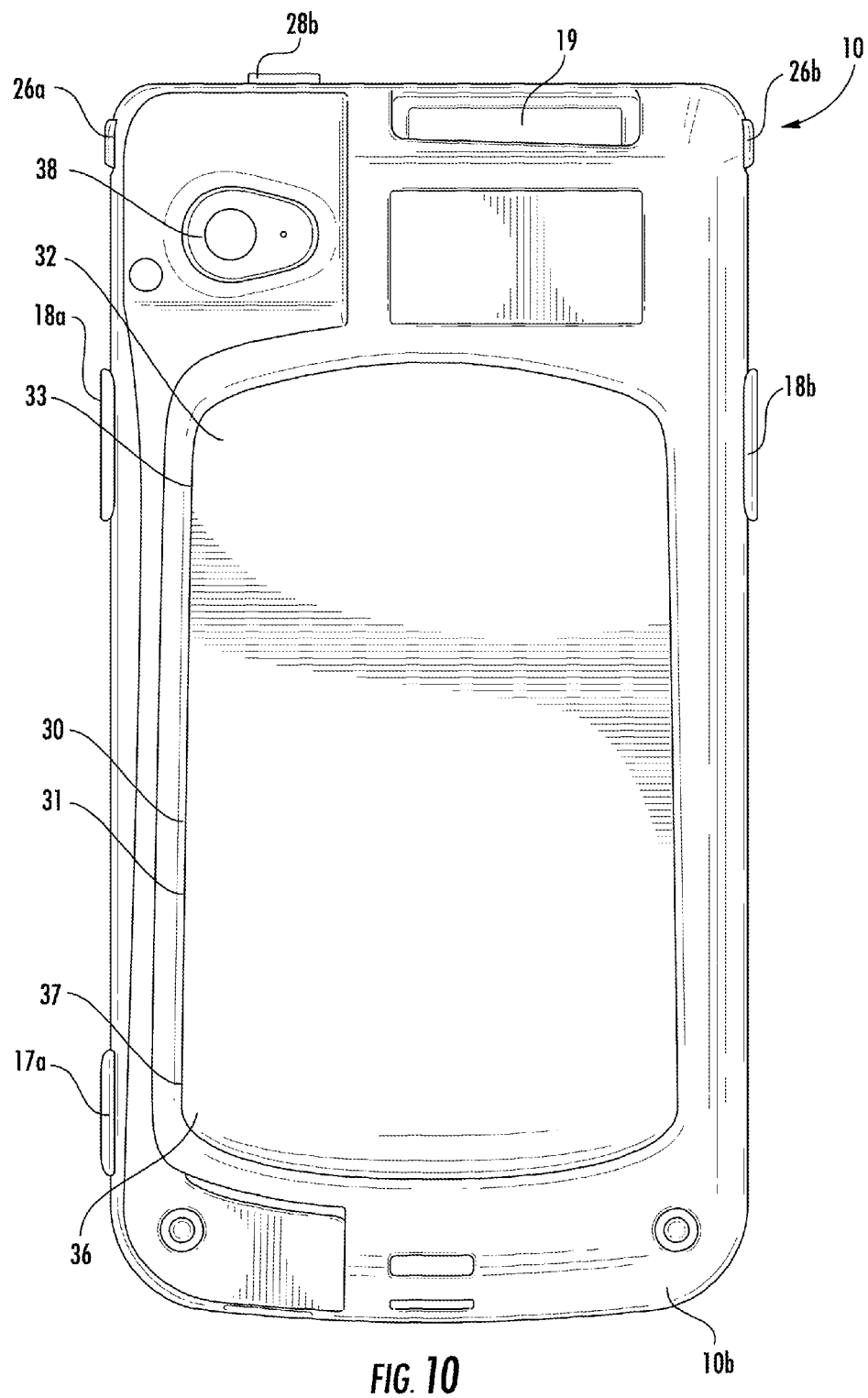
FIG. 10 depicts yet another view of the exemplary enclosure of FIGS. 1-2 and 5-9.

FIG. 10 depicts yet another view of the exemplary enclosure 10 of FIGS. 1-2 and 5-9. As depicted, the enclosure 10 includes a camera aperture 38. The camera aperture 38 may be part of a camera system within the enclosure 10 (e.g., a camera lens and/or flash illumination device). The camera aperture 38 may also be a transparent window or aperture for the camera system of an electronic device within the enclosure 10.

Figure 11:
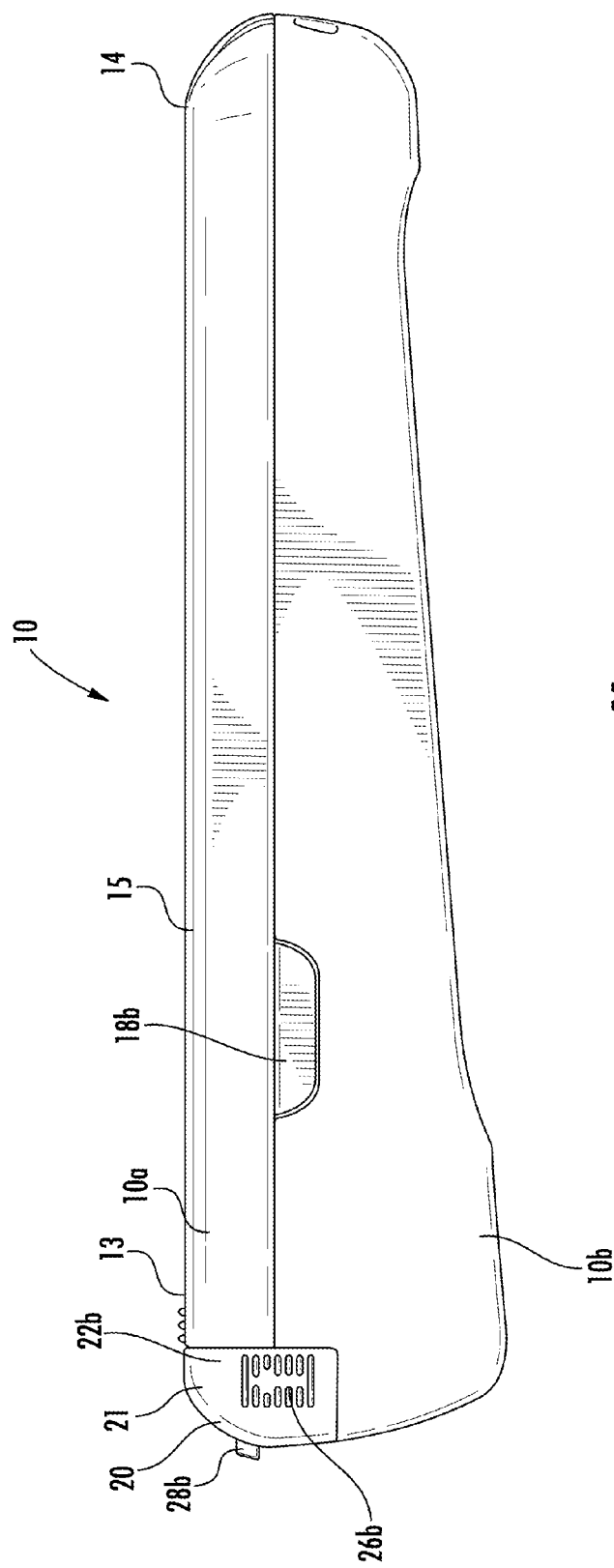
FIG. 11 depicts yet another view of the exemplary enclosure of FIGS. 1-2 and 5-10.

FIG. 11 depicts a side view of the exemplary enclosure 10 of FIGS. 1-2 and 5-10. As noted, the enclosure 10 includes another auxiliary button 18b.

Figure 12:
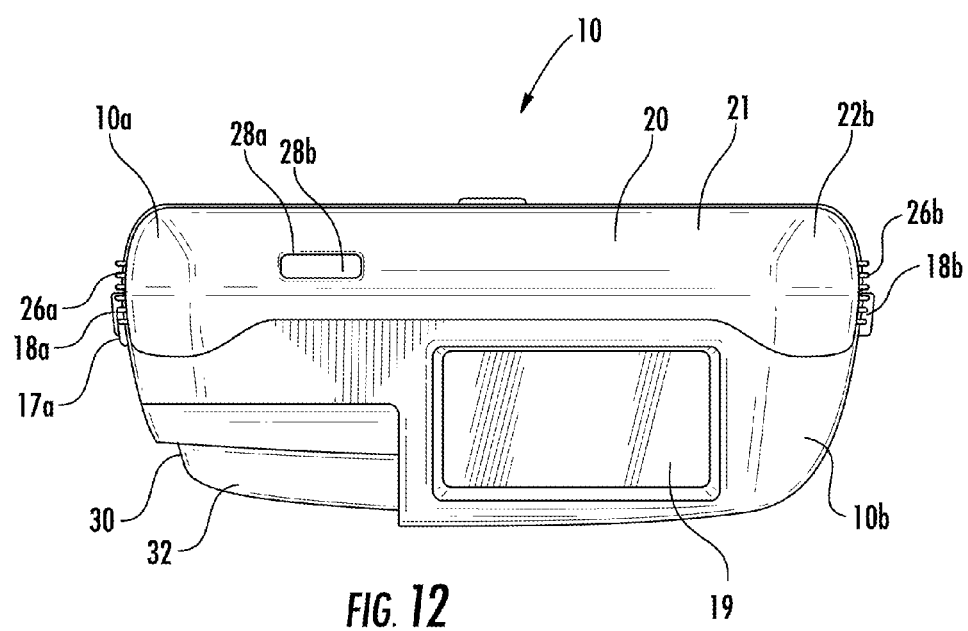
FIG. 12 depicts yet another view of the exemplary enclosure of FIGS. 1-2 and 5-11.

FIG. 12 depicts another view of the exemplary enclosure 10 of FIGS. 1-2 and 5-11. As noted, the exemplary enclosure includes a transmission window 19, a slot 30, and the slot's upper section 32, each of which is at least partially visible in the depicted view.

Figure 13:
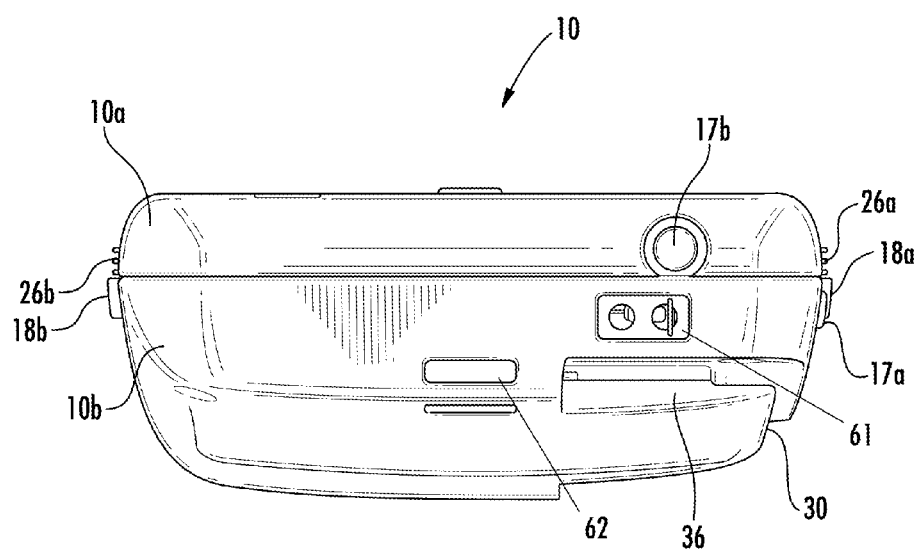
FIG. 13 depicts yet another view of the exemplary enclosure of FIGS. 1-2 and 5-12.

FIG. 13 depicts yet another view of the exemplary enclosure 10 of FIGS. 1-2 and 5-12. As depicted, the enclosure includes another auxiliary port 17b. The auxiliary port 17b may be an input/output connector (e.g., a headphone jack) for providing a connection between the enclosure and an external device (e.g., headphones). The auxiliary port 17b may also be an opening in the enclosure 10 that provides access to a port in an electronic device 40 within the enclosure 10. The depicted exemplary enclosure 10 has two auxiliary ports 17a and 17b, but it is within the scope of the present invention for the enclosure 10 to have three or more auxiliary ports.

As depicted, the exemplary enclosure 10 includes a charge plate 61 to facilitate charging of the electronic device 40 while it is within the enclosure 10. The charge plate 61 provides a connection between an external cradle accessory in which the enclosure 10 may be placed and the charging circuit of the device 40. The exemplary enclosure 10 also includes an accessory slot 62 to facilitate the attachment of suitable accessories (e.g., a lanyard).

In the specification and/or figures, typical embodiments of the invention have been disclosed. The present invention is not limited to such exemplary embodiments. The use of the term "and/or" includes any and all combinations of one or more of the associated listed items. Unless otherwise noted, specific terms have been used in a generic and descriptive sense and not for purposes of limitation.

The invention claimed is:

1. A slot for a magnetic card reading system, comprising:
a central section having a first inner surface and a second inner surface that are (i) substantially parallel and (ii) separated from each other by a substantially uniform central separation D, the central section's first and second inner surfaces defining a swipe plane parallel to and equidistant from the central section's first and second inner surfaces; and
an upper section joined to the central section at an upper junction, the upper section having a first inner surface adjoining the central section's first inner surface and a second inner surface adjoining the central section's second inner surface;
wherein the upper section's first inner surface is separated from the swipe plane by a separation X1;
wherein the upper section's second inner surface is separated from the swipe plane by a separation X2;
wherein, at the upper junction between the central section and the upper section, the separation X1+X2 between the upper section's first inner surface and the upper section's second inner surface is approximately equal to the central separation D;
wherein the separation X1 increases as the distance from the upper junction along the swipe plane increases;

wherein the separation X2 increases as the distance from the upper junction along the swipe plane increases; and a lower section joined to the central section at a lower junction, the lower section having a first inner surface adjoining the central section's first inner surface and a second inner surface adjoining the central section's second inner surface;

wherein the lower section's first inner surface is separated from the swipe plane by a separation Y1;

wherein the lower section's second inner surface is separated from the swipe plane by a separation Y2;

wherein, at the lower junction between the central section and the lower section, the separation Y1+Y2 between the lower section's first inner surface and the lower section's second inner surface is approximately equal to the central separation D;

wherein the separation Y1 increases as the distance from the lower junction along the swipe plane increases; and wherein the separation Y2 is substantially constant as the distance from the lower junction along the swipe plane increases.

2. The slot according to claim 1, wherein the separation X1 and the separation X2 increase linearly as the distance from the upper junction along the swipe plane increases.

3. The slot according to claim 1, wherein the separation X1 and the separation X2 increase parabolically as the distance from the upper junction along the swipe plane increases.

4. The slot according to claim 1, wherein the separation X1 and the separation X2 remain approximately equal as the distance from the upper junction along the swipe plane increases.

5. The slot according to claim 1, wherein the separation X1 and the separation X2 increase at different rates as the distance from the upper junction along the swipe plane increases.

6. The slot according to claim 1, wherein the upper section's first inner surface and the upper section's second inner surface define an angle of approximately 31 degrees.

7. The slot according to claim 1, wherein the separation Y1 increases linearly as the distance from the lower, junction along the swipe plane increases.

8. The slot according to claim 1, wherein the separation Y1 increases parabolically as the distance from the lower junction along the swipe plane increases.

9. The slot according to claim 1, wherein the tower section's first inner surface and the lower section's second inner surface define an angle of approximately 19 degrees.

10. An electronic device enclosure, comprising:
a magnetic card reading system; and
a slot for the magnetic card reading system, comprising:
a central section having a first inner surface and a second inner surface that are (i) substantially parallel and (ii) separated from each other by a substantially uniform central separation D, the central section's first and second inner surfaces defining a swipe plane parallel to and equidistant from the central section's first and second inner surfaces; and
an upper section joined to the central section at an upper junction, the upper section having a first inner surface adjoining the central section's first inner surface and a second inner surface adjoining the central section's second inner surface;
wherein the upper section's first inner surface is separated from the swipe plane by a separation X1;
wherein the upper section's second inner surface is separated from the swipe plane by a separation X2;
wherein, at the upper junction between the central section and the upper section, the separation X1+X2 between the upper section's first inner surface and the upper section's second inner surface is approximately equal to the central separation D;
wherein the separation X1 increases as the distance from the upper junction along the swipe plane increases;
wherein the separation X2 increases as the distance from the upper junction along the swipe plane increases; and
wherein the upper section's first inner surface and the upper section's second inner surface define an angle of approximately 31 degrees.

11. The electronic device enclosure according to claim 10, wherein the separation X1 and the separation X2 increase linearly as the distance from the upper junction along the swipe plane increases.

12. The electronic device enclosure according to claim 10, wherein the separation X1 and the separation X2 increase parabolically as the distance from the upper junction along the swipe plane increases.

13. The electronic device enclosure according to claim 10, wherein the separation X1 and the separation X2 remain approximately equal as the distance from the upper junction along the swipe plane increases.

14. The electronic device enclosure according to claim 10, wherein the separation X1 and the separation X2 increase at different rates as the distance from the upper junction along the swipe plane increases.

15. An electronic device enclosure, comprising:
an image capture and processing system;
a magnetic card reading system; and
a slot for the magnetic card reading system, comprising:
a central section having a first inner surface and a second inner surface that are (i) substantially parallel and (ii) separated from each other by a substantially uniform central separation D, the central section's first and second inner surfaces defining a swipe plane parallel to and equidistant from the central section's first and second inner surfaces; and
an upper section joined to the central section at an upper junction, the upper section having a first inner surface adjoining the central section's first inner surface and a second inner surface adjoining the central section's second inner surface;
wherein the upper section's first inner surface is separated from the swipe plane by a separation X1;
wherein the upper section's second inner surface is separated from the swipe plane by a separation X2;
wherein, at the upper junction between the central section and the upper section, the separation X1+X2 between the upper section's first inner surface and the upper section's second inner surface is approximately equal to the central separation D;
wherein the separation X1 increases as the distance from the upper junction along the swipe plane increases; and
wherein the separation X2 increases as the distance from the upper junction along the swipe plane increases.

16. The electronic device enclosure according to claim 15, comprising a transmission window for the image capture and processing system.

17. The electronic device enclosure according to claim 15, comprising a camera aperture.

18. The electronic device enclosure according to claim 15, comprising a first door at a front edge and a second door at a back edge.

* * * * *